US012709041B2

(12) United States Patent
Van Vlassenrode

(10) Patent No.: US 12,709,041 B2
(45) Date of Patent: Aug. 18, 2026

(54) METHODS TO PROVIDE A FLOOR COVERING

(71) Applicant: UNILIN, BV, Wielsbeke (BE)

(72) Inventor: Kristof Van Vlassenrode, Deinze (BE)

(73) Assignee: UNILIN, BV, Wielsbeke (BE)

( * ) Notice: Subject to any disclaimer, the term of this patent is extended or adjusted under 35 U.S.C. 154(b) by 96 days.

(21) Appl. No.: 18/889,809

(22) Filed: Sep. 19, 2024

(65) Prior Publication Data

US 2025/0010512 A1 Jan. 9, 2025

Related U.S. Application Data

(63) Continuation of application No. 17/251,836, filed as application No. PCT/IB2019/054677 on Jun. 5, 2019, now Pat. No. 12,128,582.

(30) Foreign Application Priority Data

Jul. 2, 2018 (EP) .................................... 18181197

(51) Int. Cl.
*B29C 43/22* (2006.01)
*B27N 3/24* (2006.01)
(Continued)

(52) U.S. Cl.
CPC ................ *B27N 3/24* (2013.01); *B27N 3/28* (2013.01); *B29C 43/222* (2013.01); *B29C 43/28* (2013.01);
(Continued)

(58) Field of Classification Search
CPC ......... B32B 27/304; B32B 38/06; B32B 3/06; B32B 5/18; B32B 27/065; B32B 5/024; B32B 5/245; B32B 27/12; B32B 27/08; B32B 27/308; B32B 5/022; B32B 2262/101; B32B 2307/718; B32B 2419/04; B30B 5/06; B29C 48/0021; B29C 48/07;
(Continued)

(56) References Cited

U.S. PATENT DOCUMENTS 4,312,686 A 1/1982 Smith et al.
9,156,233 B2 10/2015 Dossche et al.
(Continued)

FOREIGN PATENT DOCUMENTS

EP 2402155 A1 1/2012
WO 2011141849 A1 11/2011
(Continued)

OTHER PUBLICATIONS

ISR and Written Opinion in corresponding PCT Application No. PCT/IB2019/054677, dated Sep. 11, 2019.
(Continued)

*Primary Examiner* — Monica A Huson
(74) *Attorney, Agent, or Firm* — Workman Nydegger

(57) ABSTRACT

A method to provide a floor covering, the steps of: providing a sheet vinyl; a PVC intermediate including at least a first layer of PVC material and at least a first reinforcing sheet, the first layer of PVC material providing the upper side of the PVC intermediate. The method also includes adhering the sheet vinyl to the PVC intermediate by laminating the lower side of the sheet vinyl to the upper side of the PVC intermediate.

19 Claims, 10 Drawing Sheets

(51) Int. Cl.

| | |
|---|---|
| ***B27N 3/28*** | (2006.01) |
| ***B29C 43/28*** | (2006.01) |
| ***B29C 43/30*** | (2006.01) |
| ***B29C 48/00*** | (2019.01) |
| ***B29C 48/07*** | (2019.01) |
| ***B29C 70/50*** | (2006.01) |
| *B29K 27/06* | (2006.01) |
| *B29K 105/06* | (2006.01) |

(52) U.S. Cl.
CPC .......... *B29C 43/30* (2013.01); *B29C 48/0011* (2019.02); *B29C 48/0021* (2019.02); *B29C 48/07* (2019.02); *B29C 70/506* (2013.01); *B29C 2793/0027* (2013.01); *B29C 2793/009* (2013.01); *B29K 2027/06* (2013.01); *B29K 2105/06* (2013.01)

(58) Field of Classification Search
CPC ....... B29C 70/506; B29C 43/28; B29C 43/30; B29C 48/0011; B29C 2793/0027; B29C 2793/009; B27N 3/28; B27N 3/24; B26C 43/222; B29K 2027/06; B29K 2105/06
See application file for complete search history.

(56) References Cited

U.S. PATENT DOCUMENTS

| | | | | |
|---|---|---|---|---|
| 9,415,574 | B2 | 8/2016 | Duyck et al. | |
| 10,343,381 | B2 * | 7/2019 | Troendle | B32B 5/18 |
| 2006/0156663 | A1 | 7/2006 | Mao | |
| 2013/0147090 | A1 | 6/2013 | Schramm et al. | |
| 2015/0165748 | A1 | 6/2015 | Anspach et al. | |
| 2015/0267025 | A1 | 9/2015 | Fang | |
| 2016/0281367 | A1 * | 9/2016 | Jiang | E04F 15/107 |
| 2017/0136674 | A1 | 5/2017 | Chen et al. | |
| 2017/0167145 | A1 | 6/2017 | Naeyaert | |
| 2017/0368760 | A1 | 12/2017 | Troendle et al. | |
| 2019/0383030 | A1 | 12/2019 | Lombaert et al. | |
| 2021/0046742 | A1 * | 2/2021 | Rosbrook | B32B 27/32 |

FOREIGN PATENT DOCUMENTS

| | | | |
|---|---|---|---|
| WO | 2013178561 | A2 | 12/2013 |
| WO | 2015170274 | A1 | 11/2015 |
| WO | 2015173743 | A1 | 11/2015 |
| WO | 2016001775 | A1 | 1/2016 |
| WO | 2016113377 | A1 | 7/2016 |
| WO | 2017046693 | A1 | 3/2017 |
| WO | 2017133804 | A1 | 8/2017 |
| WO | 2018065859 | A1 | 4/2018 |
| WO | 2018087638 | A1 | 5/2018 |

OTHER PUBLICATIONS

European Search Report in corresponding European Application No. 18181197.7, dated Dec. 3, 2018.

Faith Baum et al., "Element C: Interiors Interior Finished", E2, Mar. 30, 2007.

Merle Henkenius et al., "Foolproff Vinyl Flooring", Home Improvement Guide, Popular Mechanics, Apr. 1993, pp. 85-89.

* cited by examiner

METHODS TO PROVIDE A FLOOR COVERING

FIELD OF THE INVENTION

The present invention relates to floor coverings and floor covering elements. More particularly, the invention relates to methods to provide floor coverings and floor covering elements.

BACKGROUND OF THE INVENTION

Sheet vinyl is well known in the art. This material is not adapted to be converted in smaller elements which can be combined to make a floor covering.

SUMMARY OF THE INVENTION

It is an object of the present invention to provide methods to convert sheet vinyl into floor covering elements.

According to a first aspect of the invention, a method to provide a floor covering is provided, the method comprising the steps of:

- providing a sheet vinyl;
- providing a PVC intermediate comprising at least a first layer of PVC material and at least a first reinforcing sheet, the first layer of PVC material providing the upper side of the PVC intermediate;
- adhering said sheet vinyl to the PVC intermediate by lamination the lower side of the sheet vinyl to the upper side of the PVC intermediate.

The reinforcing sheet preferably is a fibrous material, i.e. a material comprising fibers. More preferred are glass fiber material such as glass fiber woven or non-woven fabrics. Such glass fiber fabrics typically have a surface weight of about 20 g/m$^2$ to 150 g/m$^2$, e.g., about 120 g/m$^2$. Typically, the glass fibers have a diameter in the range of 8 to 20 m, e.g., in the range of 10 to 18 m, and a typical length of about 0.8 to 2.5 mm, such as in the range of 1 to 2 cm. The glass fiber fabric may comprise 15 to 30% w of polymer binder.

As an alternative, the reinforcing sheet may be a polyester, polyamide or polyolefin fiber-based sheet.

The sheet vinyl comprises at least a sequence of layers being:

- a lower reinforced PVC layer providing the lower side of the sheet vinyl;
- a decorative layer contacting the reinforced PVC lower layer;
- a wear layer contacting the decorative layer.

The total thickness of the sheet vinyl is preferably in the range of 0.7 to 3 mm, such as in the range of 0.85 to 1.5 mm.

The wear layer may comprise a transparent or translucent PVC layer, optionally having a lacquer layer being the topcoat which provide the upper surface of the sheet vinyl. This composition, or in absence of the lacquer layer, the transparent or translucent PVC layer, may have a thickness typically in the range of 0.15 to 0.7 mm, such as in the range of 0.25 to 0.55 mm. The PVC of this transparent or translucent PVC layer is typically a plastisol PVC composition, preferably comprising plasticizers and a UV-stabilizing agent. The lacquer layer may have a thickness up to 0.03 mm, e.g., 0.02 mm.

A decorative layer is preferably a printed plastisol-based PVC layer with a thickness in the range of 0.15 to 0.4 mm, preferably in the range of 0.2 and 0.3 mm, and typically comprises plasticizers to provide a flexible PVC layer. This decorative layer may be a foamed PVC layer. Suitable decorative and wear layers are set out in WO2018065859, hereby incorporated by reference.

The reinforced PVC layer of the sheet vinyl is a PVC layer, which may comprise foamed PVC material. It is reinforced by means of at least one reinforcing element, preferably being a fibrous material, i.e. a material comprising fibers. More preferred are glass fiber material such as glass fiber woven or non-woven fabrics. This reinforcement layer may be provided within and encompassed by the PVC material of this layer, or it may provide the lower surface of the reinforced PVC layer. In either of the cases, the PVC material is typically well impregnated within the open area of the fibrous material.

The fibrous material is preferably a glass fiber fabrics typically have a surface weight of about 20 g/m$^2$ to 150 g/m$^2$, e.g., about 120 g/m$^2$. Typically, the glass fibers have a diameter in the range of 8 to 20 m, e.g., in the range of 10 to 18 m, and a typical length of about 0.8 to 2.5 mm, such as in the range of 1 to 2 cm. The glass fiber fabric may comprise 15 to 30% w of polymer binder. As an alternative, the reinforcing sheet may be a polyester, polyamide or polyolefin fiber-based sheet.

The reinforced PVC layer may comprise fillers such as glass fibers, chalk or calcium carbonate, slaked lime, calciumhydrocarbonate, talc, microspheres (such as Excpancell®) and any combinations of these. The reinforced PVC layer is provided from flexible PVC, comprising a significant amount of plasticizers. Typically this amount is in a range of more than 12 phr, even up to 60 phr or more, e.g., 65 phr. Typical plasticizers are esters of carboxylic acids (like iso- or terephthalic acid, tri-mellitic acid and/or adipic acid) such as diisononyl phthalate (DINP), dioctyl terephthalate (DOPT), di-isononyl-1,2-cyclohexanedicarboxylate (DINCH), esters of phosphoric acid, such as triaryl- or tria-lkylarylphosphates, e.g., tricresylphosphate, chlorinated or non-chlorinated hydrocarbons, ethers, polyesters, polyglycoles, solphonamides or combinations of all those. The reinforced PVC layer may further comprise other additives, such as viscosity reducers, pigments, and alike.

The reinforced PVC layer in the sheet vinyl may preferably have a thickness in the range of 0.4 to 2 mm, preferably in the range of 0.5 to 1.5 mm, e.g., in the range of 0.5 to 1.1 mm. The PVC material of the reinforced PVC layer may be provided as a combination of multiple layers of plastisol PVC material.

According to some embodiments, the method may comprise the step of embossing at least wear layer after said lamination step.

In case the sheet vinyl was embossed prior to using it in the method according to the invention, the embossing provided in this step of the method of the invention may be made in report to the embossing which was already present at the top surface of the sheet vinyl. “In report” means that the profile embossed to the sheet vinyl by the step of the invention coincide with the profile, or the remainders of the profile, which was previously present.

The embossing will be present in the wear layer (optionally including its lacquer layer), and may penetrate even in the decorative layer.

The lamination step may be a thermal lamination step. One or both of the lower side of the sheet vinyl and the upper side of the PVC intermediate may be heated, such as by using IR radiation heating. As an alternative, lamination using a glue may be used.

Preferably the PVC intermediate may have a thickness in the range of 3 to 6 mm, such as in the range of 3.2 to 5 mm.

According to some embodiments, the PVC material of the PVC intermediate may comprise foamed PVC.

The density of these foamed PVC material is preferably in the range of 0.75 to 1.7 kg/dm$^3$, most preferred in the range of 1.0 to 1.25 kg/dm$^3$.

With a foamed PVC material, a PVC is meant which has hollow spaces, preferably so much that the density of the material is reduced by at least 10%, more preferred at least 25%, as compared to the density of an equal volume of PVC without such hollow spaces. Preferably a closed call foam is provided. Unfoamed PCV means a PVC having less or no such hollow spaces, such that the density is reduced less than 10%, preferably less than 2%, as compared to the density of an equal volume of PVC without such hollow spaces.

The foamed layer does not need to be foamed uniformly throughout the whole PVC layer. It is possible that the foaming varies through the thickness of the layers an example can the central core of the layer comprise the highest amount of hollow spaces, while at one or both outer sides of the PVC layer, less or even no hollow spaces are present.

Foamed PVC can be obtained via a number of methods, such as but not limited to the following methods.

According to a first method, the foamed PVC can be obtained by mechanical foaming. With this it is understood that the hollow spaces are obtained by displacing the PVC material and replacing it by a gas (e.g., ambient air or compressed air), usually under influence of a mechanical action and/or by injection of gas (such as air) and/or by introducing expanding particles.

According to a second method, a chemical foaming agent can be introduced in the PVC, such that hollow spaces are created by a chemical reaction of these agents. As an example, one can use azodicarbonamide, which will release nitrogen upon heating, which remains present in the PVC as gas bubbles.

According to a third method, hollow fillers such as Expancell® particles are introduced in the PVC, or microspheres as mentioned in WO2013/178561.

According to some embodiments, the PVC material of the PVC intermediate may comprise non-foamed PVC material.

In case of non-foamed PVC material, the density of these non-foamed PVC is preferably in the range of 1.7 to 2.1 kg/dm$^3$, most preferred in the range of 1.8 to 1.9 kg/dm$^3$.

According to some embodiments, the PVC material of the PVC intermediate may comprise semi-rigid or rigid PVC material.

The PVC is preferably semi rigid or rigid PVC, comprising some or no amount of plasticizers. For semi-rigid PVC, the amount of plasticizer is in a range of 6 to 12 phr.

For rigid PVC, the amount of plasticizer is typically less than 6 phr. The rigid PVC material may be plasticizer free.

According to some embodiments, the PVC material of the PVC intermediate may comprise flexible PVC material.

The flexible PVC material may comprise more than 12 phr plasticize rs, even 65 phr of plasticizers or more.

Typical plasticizers used for these PVC material are esters of carboxylic acids (like iso- or terephthalic acid, tri-mellitic acid and/or adipic acid) such as diisononyl phthalate (DINP), dioctyl terephthalate (DOPT), di-isononyl-1,2-cyclohexanedicarboxylate (DINCH), esters of phosphoric acid, such as triaryl- or trialkylarylphosphates, e.g., tricresylphosphate, chlorinated or non-chlorinated hydrocarbons, ethers, polyesters, polyglycoles, solphonamides or combinations of all those The PVC material used for extrusion may have a K-value ranging from 50 to 67. The K value is the Fikentscher K value as referenced in DIN EN ISO 1628-1. More preferred, a K value in the range of 52 to 60 is used, such as a K value of 57. The PVC may comprise as polymer polyvinylchloride, or if may be a copolymer of vinylchloride and vinyl acetate. The PVC material used for extrusion may comprise 30 to 70% w of fillers (% w based on total mass of the material), such as glass fibers, chalk or carbon carbonate, slaked lime, calciumhydrocarbonate, talc, microspheres (such as Excpancell®) and any combinations of these. The PVC material may further comprise additives such as colorants and/or pigments, thermal stabilizers such as Ca/Zn based components, lubricants to facilitate the extrusion, and alike.

According to some embodiments, the PVC material present in the PVC intermediate may be extruded PVC material.

According to some embodiments, the extruded PVC intermediate may be provided by extruding the first layer of extruded PVC material on one side of the at least one reinforcement sheet.

Typically the reinforcement sheet will provide the lower surface of the extruded PVC intermediate, and after combining it with the sheet vinyl, it will provide the lower surface of the floor covering.

According to some embodiments, the first layer of extruded PVC material may be a multi layered stack of at least two co-extruded PVC sublayers, obtained by co-extrusion of a first PVC material providing the first of the at least two sublayers, and a second PVC material providing the second of the at least two sublayers.

According to some embodiments, the first layer of extruded PVC material may be a multi layered stack of three co-extruded PVC sub layers, a first PVC material providing the first and the third of the at least two sublayers, and a second PVC material providing the second of the at least two sublayers positioned between the first and third sublayer.

According to some embodiments, the extruded PVC intermediate may comprise two layers of extruded PVC material, the first layer of extruded PVC material is provided by extruding PVC material on a first side of the reinforcement sheet, the second layer of extruded PVC material being provide by extruding PVC material to the second side of the reinforcement sheet.

Possibly, the extruded PVC material extruded above the reinforcement sheet is the same as the extruded PVC material extruded under the reinforcement sheet. However in the alternative, the extruded PVC material extruded above the reinforcement sheet is different from the extruded PVC material extruded under the reinforcement sheet.

According to some embodiments, the extruded PVC intermediate may comprise at least a first and a second reinforcing sheet, the method comprises the steps of:

- providing the first layer of extruded PVC material by extruding PVC material on a first side of the first reinforcement sheet,
- providing the second layer of extruded PVC material by extruding PVC material to the second side of the first reinforcement sheet and on a first side of the second reinforcing sheet.

The second reinforcing sheet may thereby provide the lower side of the extruded PVC intermediate.

According to some embodiments, the second layer of extruded PVC material may be a multi layered stack of at least two co-extruded PVC sublayers, obtained by co-extrusion of a first PVC material providing the first of the at least two sublayers, and a second PVC material providing the second of the at least two sublayers.

According to some embodiments, the second layer of extruded PVC material may be a multi layered stack of three co-extruded PVC sub layers, a first PVC material providing the first and the third of the at least two sublayers, and a second PVC material providing the second of the at least two sub layers positioned between the first and third sublayer.

According to some embodiments, the first layer of extruded PVC material may be a multi layered stack of two coextruded PVC sublayers, obtained by co-extrusion of a first PVC material providing the first of the two sub layers, and a second PVC material providing the second of the two sublayers, the second layer of extruded PVC material may be a multi layered stack of two co-extruded PVC sublayers, obtained by co-extrusion of a third PVC material providing the first of the two sublayers, and a fourth PVC material providing the second of the two sublayers, and wherein the second of the two sublayers of the first layer of extruded PVC material may be in contact with the first of the two sub layers of the second layer of extruded PVC material, optionally in contact through the first reinforcing sheet;

the first and fourth PVC material may be identical and the second and third PVC material are identical.

According to some embodiments, the PVC intermediate may be provided by:

providing PVC granulate, said granulates consisting of PVC material;

providing the first reinforcing sheet;

deposit the first reinforcing sheet on a transporting device;

strewing said PVC granulate on said first reinforcing sheet;

passing said PVC granulate by the transporting device along a heating means for heating said PVC granulate on said first reinforcing sheet;

passing said heated PVC granulate by the transporting device along a continuous pressing device for consolidating said PVC granulate thereby providing the PVC intermediate;

optionally cooling said PVC intermediate.

A device suitable to perform this method is described in US20130147090A1, hereby incorporated by reference.

According to some embodiments, the first layer of PVC material of the PVC intermediate is a multilayered stack of at least two PVC sublayers, obtained by stewing of a first PVC material to provide the first of the at least two sub layers, and strewing a second PVC material on the first PVC material to provide the second of the at least two sublayers.

It is understood that more as such more than 2 sublayers may be provided, which may consist of different PVC material, or of which sublayers may consist of identical PVC material.

According to some embodiments the PVC intermediate may comprise two layers of PVC material, the method comprising the steps of:

strewing PVC granulates of a first PVC material on the transporting device to provide the first layer of PVC material;

providing the first reinforcing sheet on the transporting device by providing the first reinforcing sheet on the strewn first PVC material;

strewing PVC granulates of a second PVC material to the first reinforcement sheet to provide the second layer of PVC material.

Possibly, the PVC material positioned above the reinforcement sheet is the same as the PVC material positioned under the reinforcement sheet. However in the alternative, the PVC material positioned above the reinforcement sheet is different from the PVC material positioned under the reinforcement sheet.

According to some embodiments, the PVC intermediate may comprise at least a first and a second reinforcing sheet, the method comprises the step of providing the second reinforcing sheet prior to the strewing of the PVC granulates of a first PVC material on the transporting device.

The second reinforcing sheet may thereby provide the lower side of the PVC intermediate.

According to some embodiments, the PVC intermediate may comprise two layers of PVC material, each of the two layers being a multi layered stack of at least two PVC sublayers, the method comprising the steps of:

strewing PVC granulates of a first PVC material on the transporting device to provide the second sublayer of the second layer of PVC material;

strewing PVC granulates of a second PVC material on the strewn first PVC material on the transporting device to provide the first sublayer of the second layer of PVC material;

providing the first reinforcing sheet on the strewn second PVC material on the transporting device;

strewing PVC granulates of a third PVC material on the first reinforcing sheet on the transporting device to provide the second sublayer of the first layer of PVC material;

strewing PVC granulates of a fourth PVC material on the strewn third PVC material on the transporting device to provide the first sublayer of the first layer of PVC material;

optionally providing the second reinforcing sheet prior to the strewing of the PVC granulates of a first PVC material on the transporting device;

wherein optionally the first and fourth PVC materials are identical and the second and third PVC material are identical.

According to some embodiments, the first and fourth PVC material may be non-foamed preferably rigid PVC material, the second and third PVC material being foamed, preferably rigid or semi-rigid PVC material.

According to some embodiments, the lamination is thermal lamination.

According to some embodiments, the sheet vinyl is unembossed prior to said lamination.

Surprisingly it as found that embossment present on the sheet vinyl tends to partially or even completely disappear when the sheet vinyl is subjected to lamination, such as thermal lamination. Therefore, preferably unembossed sheet vinyl is used.

This embossing provides a relief on the surface of the floor covering, such that the recesses of the relief preferably extend only so deep that it does not penetrate in the decorative layer.

According to a second aspect of the invention, a method to provide a floor covering element is provided, the method comprising the steps of:

providing a floor covering according to any one of the preceding claims;

divide the floor covering in at least two floor covering elements.

According to some embodiments, the method further may comprise the step of providing to each of the floor covering elements, at least at two mutually opposing sides of the floor covering element, coupling means allowing two of said floor covering elements to be coupled to each other while locking the sides in a vertical direct ion perpendicular to the plane of the floor covering elements, where at least one of said sides is provided with a tongue, the opposite side being provided with a groove fit for receiving said tongue.

The coupling means can be any means known in the art. Also coupling means at the third and fourth sides of the floor covering element may be provided. These coupling means may be identical or different from the coupling means at the first and second side of the floor covering element.

Floor coverings, and floor covering elements according to the invention have various advantages. The production of sheet vinyl is a high-speed production process, and frequently such one production line may suffer overcapacity. The production of individual floor covering elements usually is a lower speed production process. Also extrusion processes are lower in speed.

By using overcapacity of the high-speed process as raw material for lower speed processes, the profitability of the high-speed process may increase.

Further, as it is feasible to shift quickly from one sheet vinyl to another, e.g., with a different decorative outlook. Hence, it is possible to provide a process to provide different floor covering elements which can be changed over in product quickly. It may enable to have a limited stock keeping of floor covering elements, as only the intermediate raw material being sheet vinyl needs to be kept in stock.

As a changeover of quality or type of extruded PVC can be made relatively quickly, one production line can change to different qualities of types of floor covering elements in a swift way.

It is also possible to product sheet vinyl—used as floor covering—and luxury vinyl tiles (LVT) with the same decorative aspect, without major difficulties. It even enables industry to change over from sheet vinyl to LVT type of floor covering elements without the need to replace and reinvest the bulk of the production machinery.

According to a further aspect of the present invention, a floor covering obtained by a method according to the first aspect of the invention is provided. According to still a further aspect of the present invention, a floor covering element obtained by a method according to the second aspect of the invention is provided.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DETAILED DESCRIPTION OF THE INVENTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups t hereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

When in this document reference is made to rigid PVC, this refers to PVC comprising less than 6 phr plasticizer. When reference is made to semi-rigid PVC, this refers to PVC comprising plasticizer in a range of 6 to 12 phr. When reference is made to flexible PVC, this PVC comprises more than 12 phr.

Figure 1:
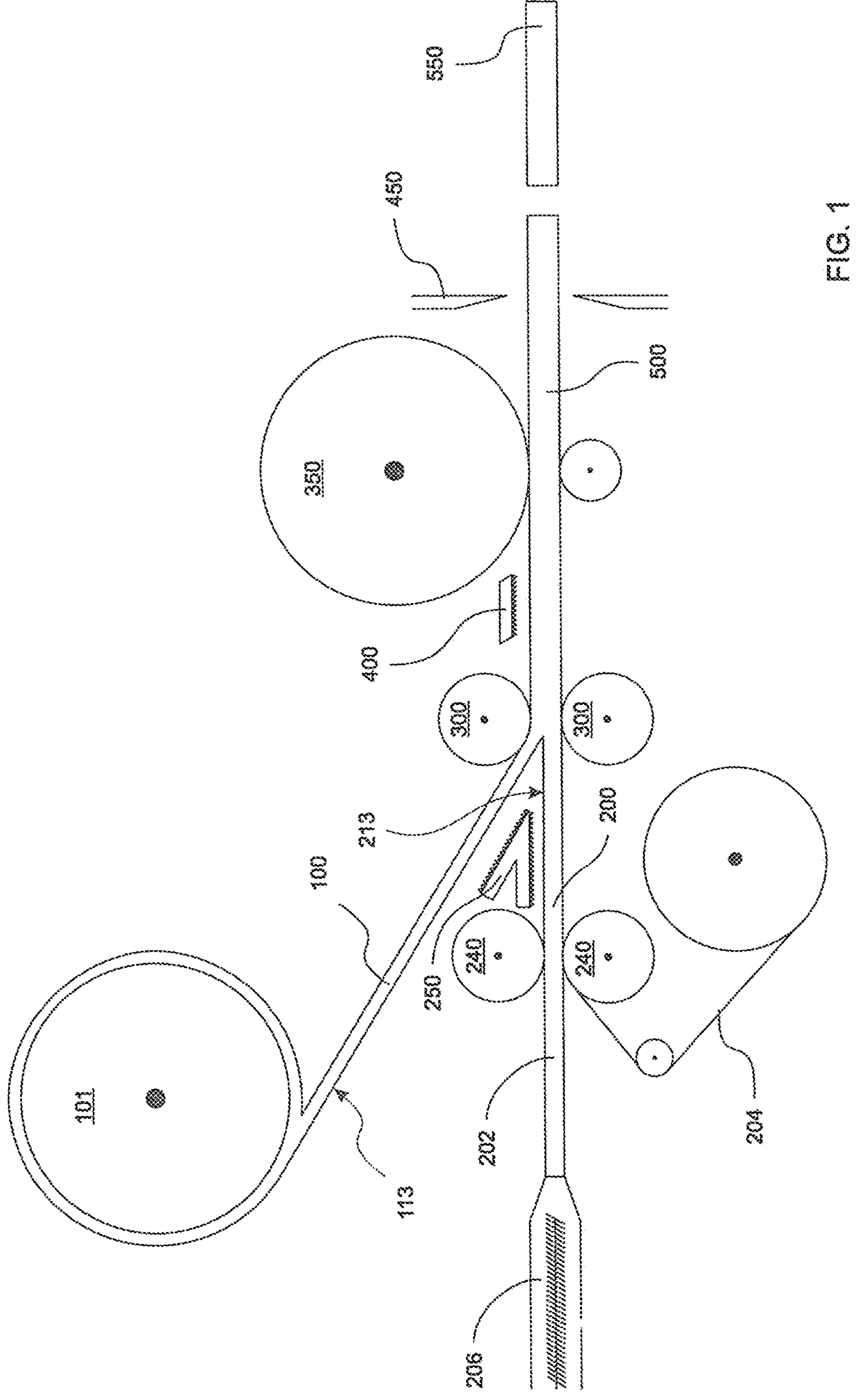
FIG. 1 is a schematically view of production method according to the invention.
Figure 2:
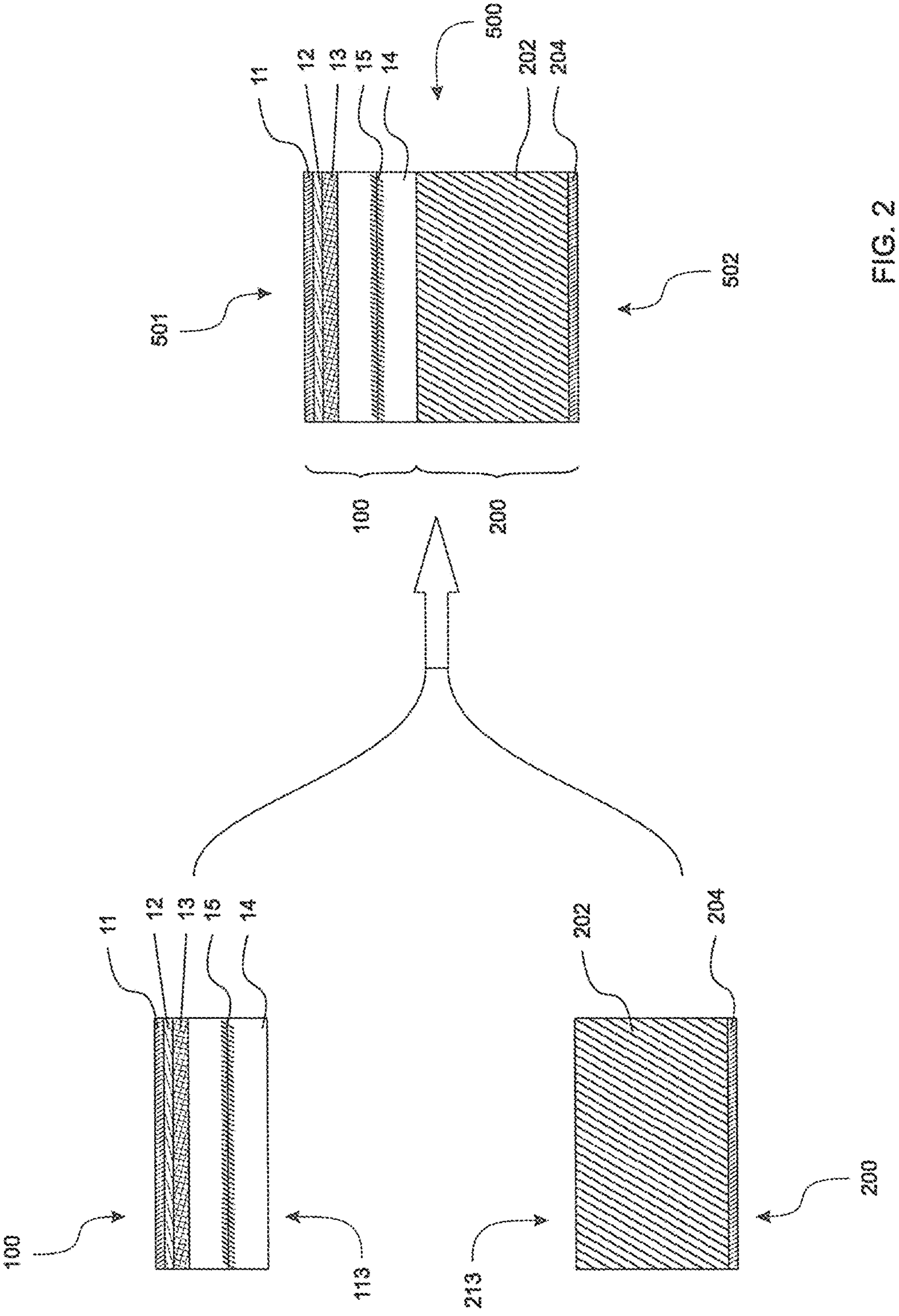
FIG. 2 is schematically view of a cross section of a product obtainable by the method as shown in FIG. 1.
Figure 3:
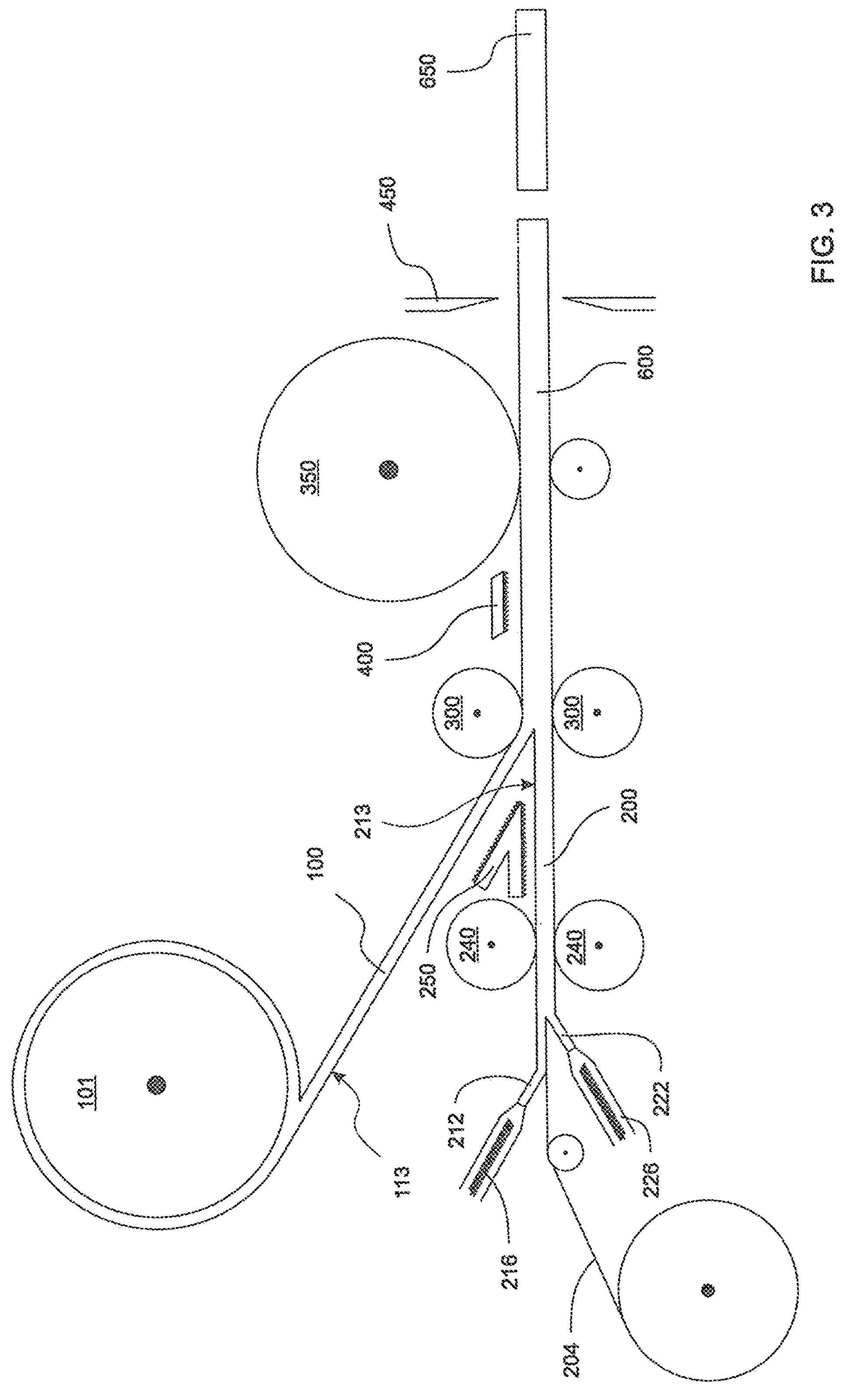
FIG. 3 is a schematically view of an alternative production method according to the invention.
Figure 4:
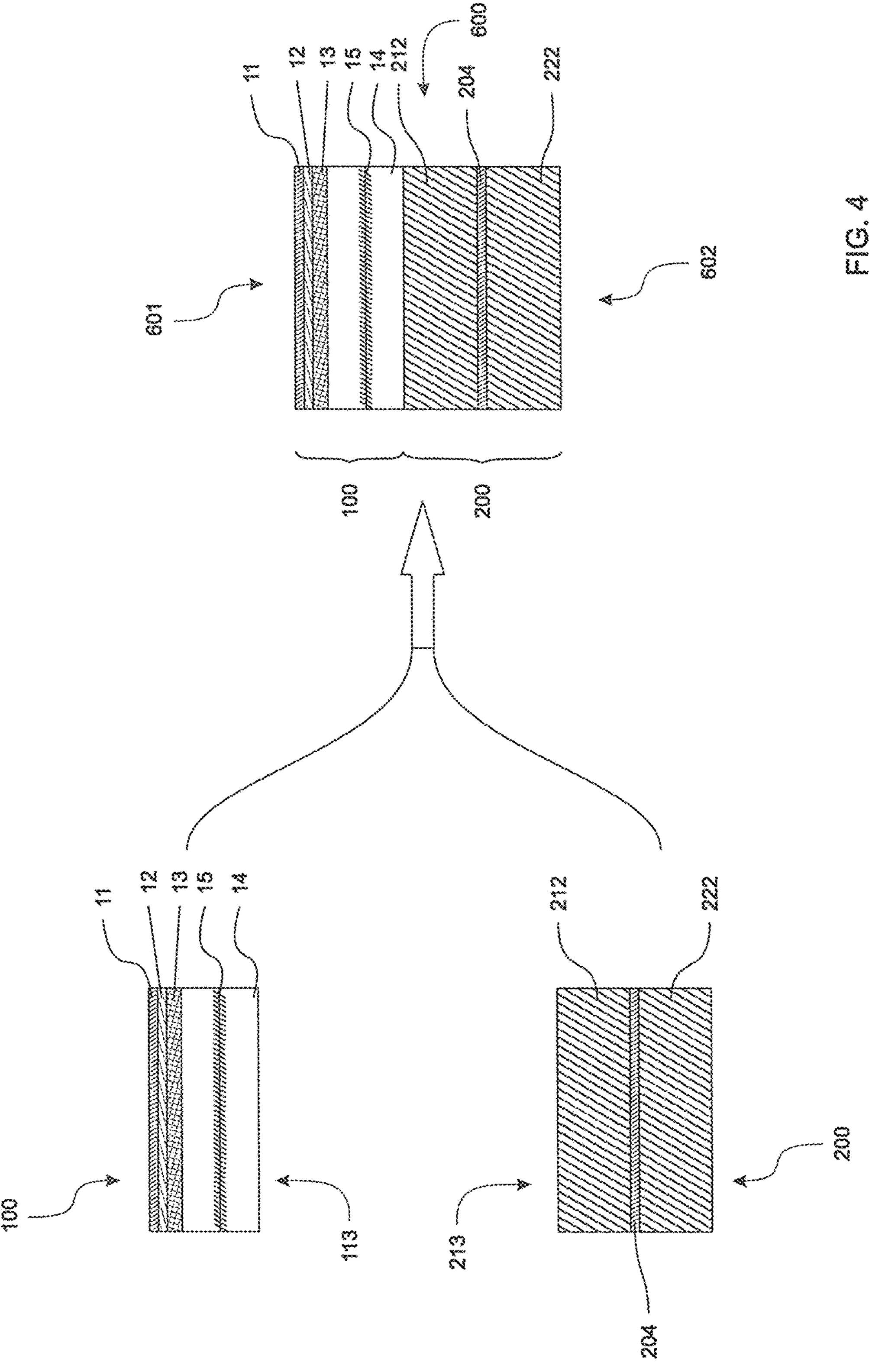
FIGS. 4 and 5 are schematically views of a cross section of a product obtainable by the method according to the invention.
Figure 5:
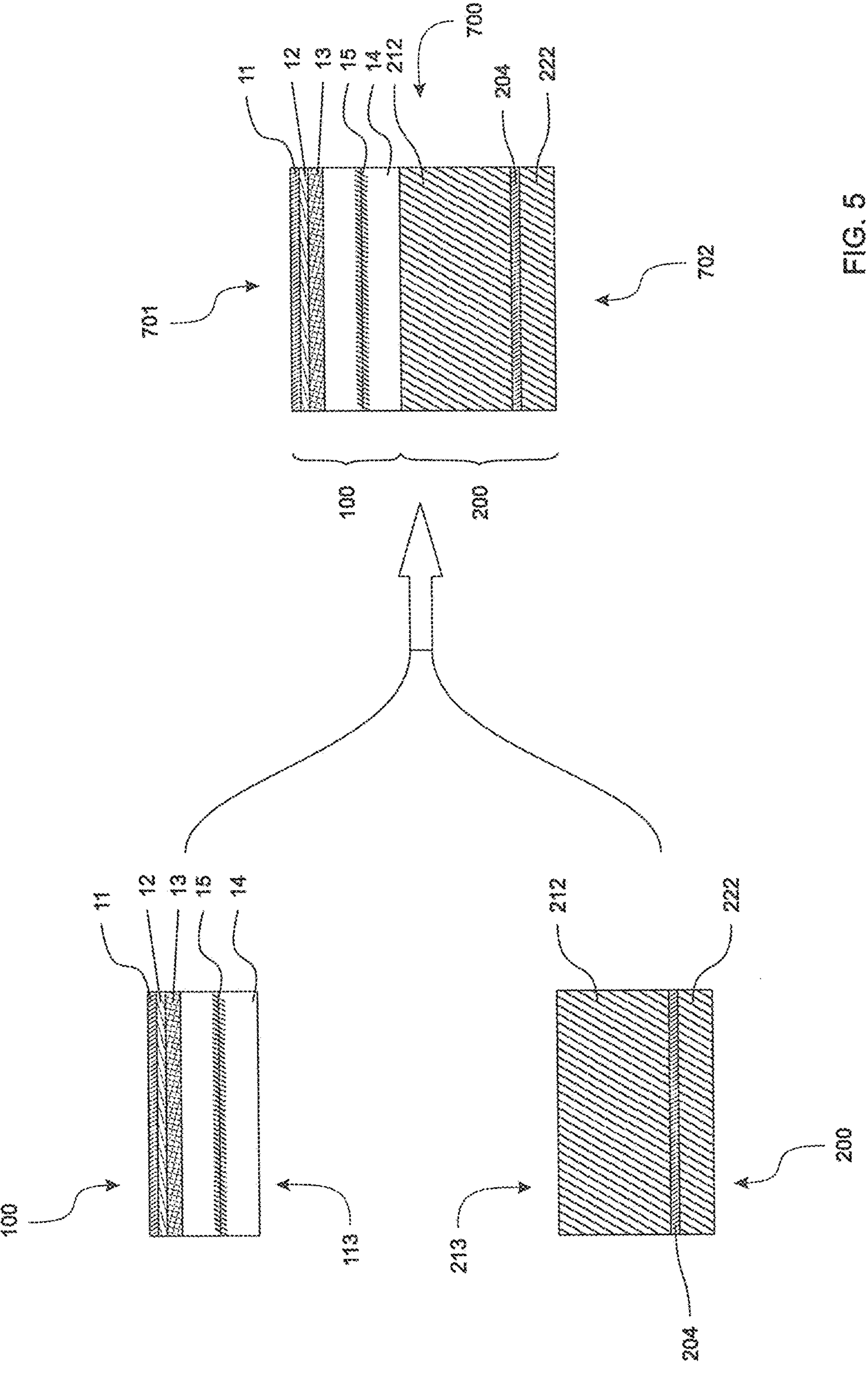

As is shown in FIGS. 1 and 3, a sheet vinyl 100 is provided, here in the form of a roll of sheet vinyl 101. The sheet vinyl, as shown in FIGS. 2, 4 and 5, this sheet vinyl comprises:

- a lower reinforced PVC layer 14, comprising PVC material and a reinforcing element being a glass fiber woven or nonwoven sheet 15;
- a decorative layer 13 contacting the PVC lower layer;
- a wear layer 12 contacting the decorative layer;
- a top-coat layer 11 contacting the wear layer and providing the upper surface of the sheet vinyl.

The method to provide a floor covering 500 is schematically shown in FIG. 1. The method comprises the steps of:

- providing a sheet vinyl 100;

providing, by means of an extruder 206, an extruded PVC intermediate 200 comprising PVC material 202 and a reinforcing sheet 204.

The sheet vinyl 100 and the extruded PVC intermediate 200 are adhered to each other via lamination. The lower surface 113 of the sheet vinyl 100 is laminated to the upper side 213 of the extruded PVC intermediate 200. One or both of the mutually facing surfaces of the sheet vinyl and the extruded PVC intermediate, which are to be adhered to each other, may first be heated by means of a heating device 250. Prior to heating, the thickness of the extruded PVC intermediate 200 may be calibrated in thickness by a calibration device, e.g., a set of calibration rollers 240. The sheet vinyl 100 and the extruded PVC intermediate 200 are laminated using a lamination device 300.

This intermediate product may be embossed by embossing roll 350. Optionally, the surface provided by the top-coat layer may first be heated by a heating device, e.g., an JR heater 400, prior to embossing. The embossing may be in register or not in register with the decorative pattern or figure visible in the decorative layer.

After embossing, the floor covering 500 may be cut in individual floor covering elements 550 by a cutting installation 450. Typically the floor covering elements 550 have a rectangular circumference. These floor covering elements may thereafter be foreseen from coupling means at at least two mutually opposing sides, optionally at four sides, by the conventional and well-known methods of grinding and milling.

In FIG. 1, the PVC 202 is extruded on one side of the reinforcing sheet 204. The reinforcing sheet 204 functions, when the floor coveting 500 is in use, as a balance sheet or balance layer to compensate for the presence of the reinforcing element 15 of the sheet vinyl used.

As shown in FIG. 2, the product obtained by the method as shown in FIG. 1, is a layered structure where the reinforcing sheet 204 is provided at the lower surface 502 of the floor covering 500 obtained. The upper surface 501 is provided by the embossed top-coat layer 11 of the sheet vinyl 100.

An alternative method is shown in FIG. 3. Same references refer to similar or even identical elements. In this embodiment, two layers 212 and 222 of extruded PVC material are provided by mean of two extruders 216 and 226, the reinforcing sheet 204 being positioned about in the middle of the two layers of extruded PVC material. These two layers of extruded PVC together with the reinforcing layer 204 together for the extruded PVC intermediate 200. A floor covering 600 and floor covering elements 650 are provided. A cross section is shown in FIG. 4.

The two layers of extruded PVC 212 and 222 may be provided from identical or from different PVC material.

Again, the reinforcing sheet 204 functions, when the floor coveting 500 is in use, as a balance sheet or balance layer to compensate for the presence of the reinforcing element 15 of the sheet vinyl used.

In still another embodiment, a cross section being shown in FIG. 5, a similar floor covering 700 is shown, where the reinforcing sheet 204 is positioned out of center of the extruded PVC intermediate 200. In this embodiment, the reinforcing sheet 204 is located closer to the lower surface 702 of the floor covering 700.

Figure 7:
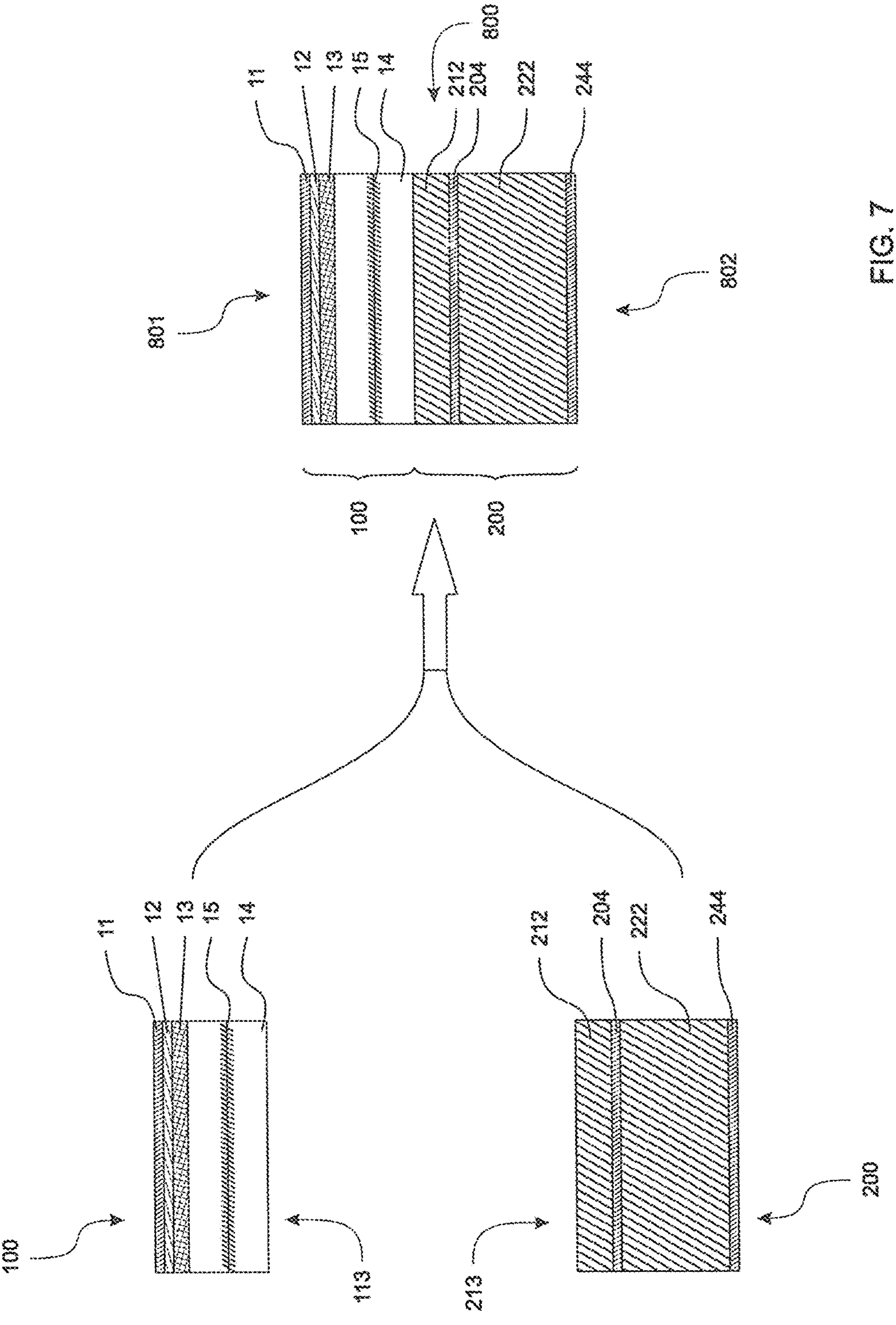
FIG. 7 is a schematically view of a cross section of a product obtainable by the method according to the invention.

In even another embodiment, a cross section being shown in FIG. 7, a similar floor covering 800 is shown, where the extruded PVC intermediate comprises two reinforcing sheets 204 and 244. The reinforcing sheet 204 is positioned in center of the extruded PVC intermediate 200, however it may be positioned our of center as well, i.e. closed or further away from the reinforcing layer 244. This layer 244 is positioned at the lowed surface of the extruded PVC intermediate 200.

Figure 6:
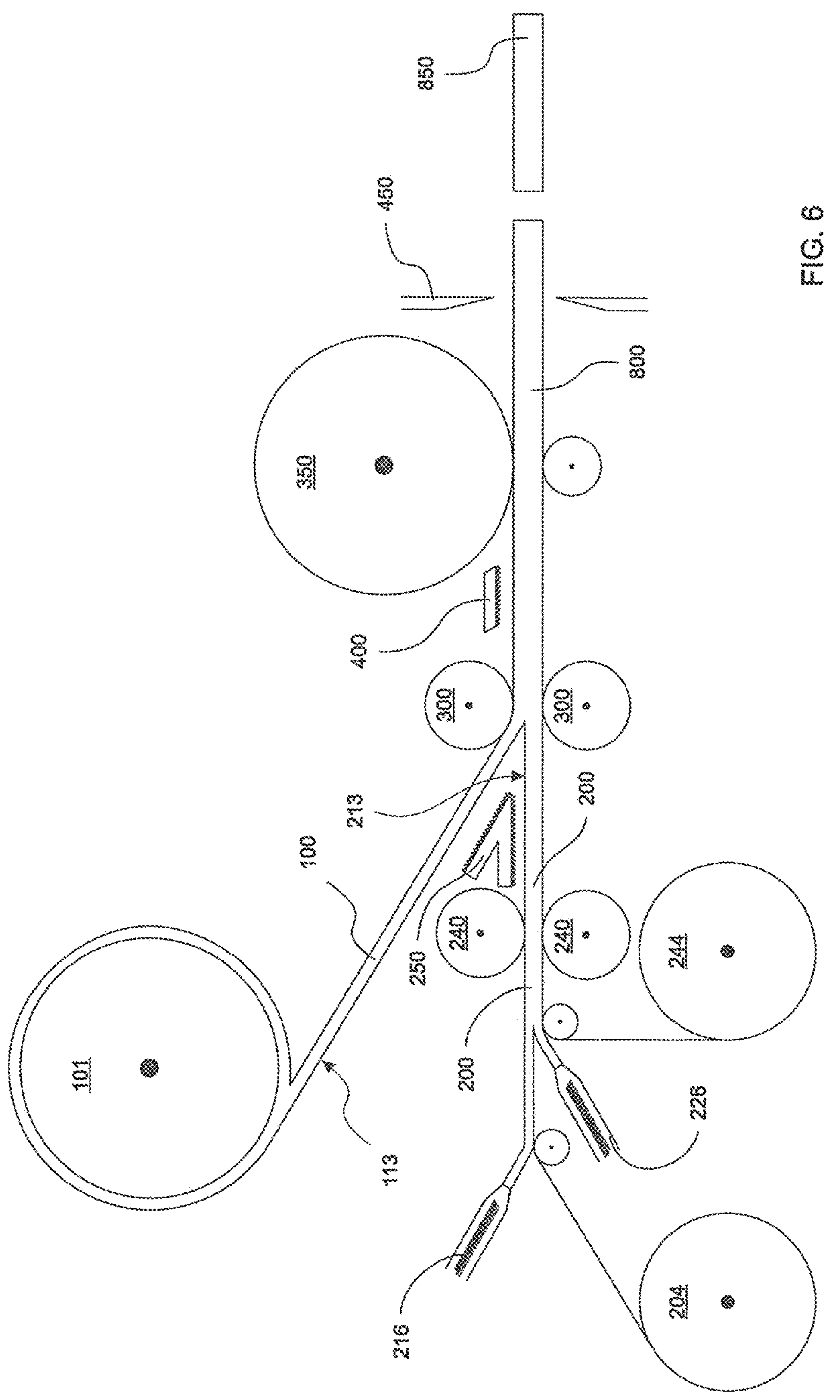
FIG. 6 is a schematically view of an alternative production method according to the invention.

A schematically view of the method is provided in FIG. 6. As is clear, the second layer of extruded PVC material 222 is extruded between the two reinforcing sheets 204 and 244.

To obtain this embodiment, the extruded PVC material of layer 222 is extruded on the reinforcing sheet 244 and combined with the extruded PVC material of layer 212 being extruded on the reinforcing sheet 204.

In all these embodiments, the PVC material to provide the extruded PVC intermediates are rigid PVC materials. When various layers of extruded PVC are used, the materials to provide the layers may be identical or different.

Similarly, in all these embodiments, the PVC material to provide the extruded PVC intermediates are non-foamed PVC materials. Some or all of them may be replaced by foamed PVC materials. When various layers of extruded PVC are used, the materials to provide the layers may be identical or different in foaming structure.

Most preferred PVC material is a copolymer of vinylchloride and vinyl acetate, with K value 57 is used for the layers of extruded PVC material. The material is plasticizer free and comprises 40% w of filler.

As reinforcing sheet for the layers of extruded PVC material is a glass fiber nonwoven sheet, impregnated with 2 abut 20% w of binder, and having a surface weight of 120 $g/m^2$.

The thickness of the extruded PVC intermediate 200 is about 3 mm.

The PVC material used in the sheet vinyl preferably is flexible PVC.

The reinforcing element of the sheet vinyl may be identic to the reinforcing sheet of the extruded PVC intermediate.

The thickness of the sheet vinyl 100 may be about 1 mm.

When the floor covering is separated in individual floor covering elements, such elements typically have a rectangular circumference, with basis of about 1.32 m and a height of about 23 cm.

Figure 8:
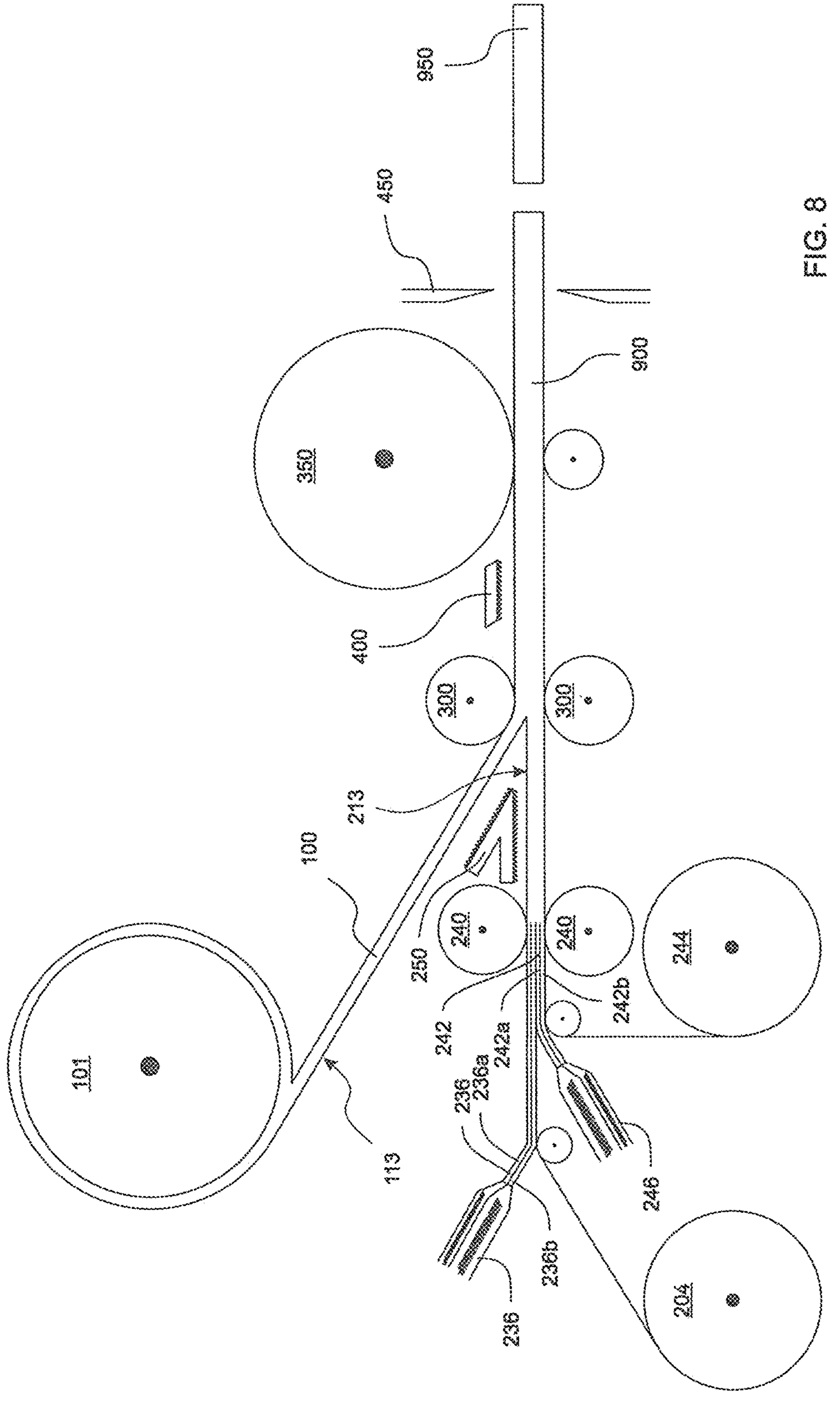
FIG. 8 is a schematically view of an alternative production method according to the invention.

An alternative method is shown in FIG. 8. Same references refer to similar or even identical elements. In this embodiment, two layers 232 and 242 of extruded PVC material are provided by mean of two extruders 236 and 246, the reinforcing sheet 204 being positioned about in the middle of the two layers of extruded PVC material. The first layer 232 of extruded PVC material, being extruded on the first reinforcing sheet 204, is a stack of two co-extruded sublayers **232*a* and 232*b*. The second layer 232 of extruded PVC material, being extruded between the first reinforcing sheet 204 and the second reinforcing sheet 244, is a stack of two co-extruded sublayers 242*a* and 242*b*. for the extrusion, an extruder 236 and 246 fit for extruding two layers one on top of the other, is used. The composition of the PVC material of sublayer 242*a* and 232*b*** are identical.

Preferably a rigid PVC which is foamed is used. The composition of the PVC material of sublayer **242*b* and 232*a*** are also identical. Preferably a rigid PVC which is not foamed is used.

Figure 9:
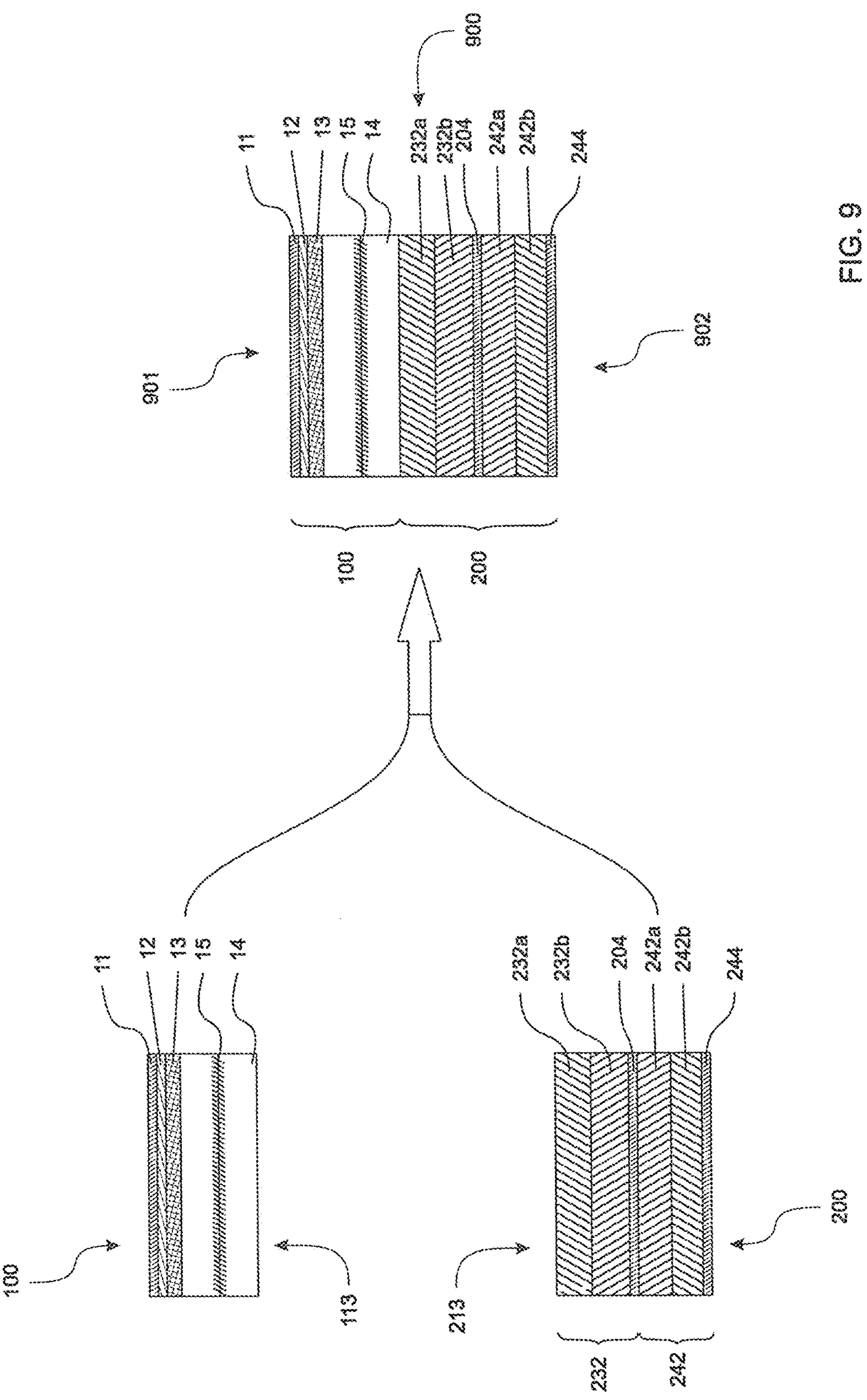
FIG. 9 is a schematically view of a cross section of a product obtainable by the method according to the invention.

These two layers of extruded PVC together with the reinforcing layers 204 and 244 together for the extruded PVC intermediate 200. A floor covering 900 and floor covering elements 950 are provided. A cross section is shown in FIG. 9.

The two layers of extruded PVC 212 and 222 may be provided from identical or from different PVC material.

The co-extruders 236 and 246 may be provided such that they extrude sublayer 232*b* respectively 242*b* being encompasses (contacted at both sides) by PVC material providing layer 232*a* respectively 242*a*. as such each of the two layers of extruded PVC material, becomes a multiple stack of 3 layers of extruded PVC material.

Figure 10:
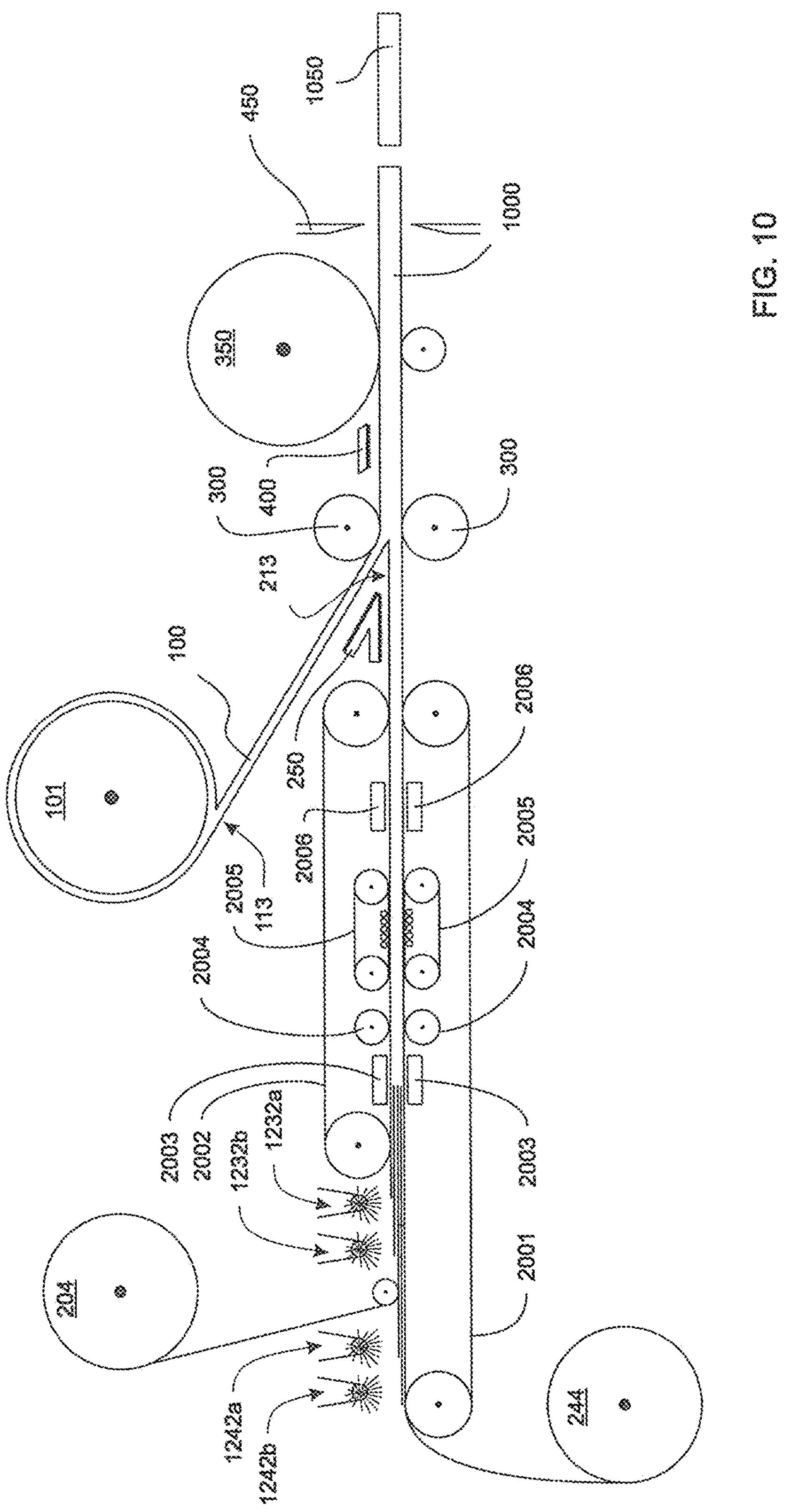
FIG. 10 is a schematically view of an alternative production method according to the invention.

An alternative method to provide a floor covering is shown in FIG. 10. The floor covering obtained has the same composition as the floor covering 900 of FIG. 9.

Again the PVC intermediate comprises two layers of PVC material, each of the two layers being a multi layered stack of at least two PVC sublayers.

The method comprising the steps of:

providing the second reinforcing sheet 244 on the transporting device strewing PVC granulates 1242*b* of a first PVC material on the transporting device 2001 to provide the second sublayer 242*b* of the second layer 242 of PVC material;

strewing PVC granulates 1242*a* of a second PVC material on the strewn first PVC material 1242*b* on the transporting device 2001 to provide the first sublayer 242*a* of the second layer 242 of PVC material;

providing the first reinforcing sheet 204 on the strewn second PVC material 1242*a* on the transporting device 2001;

strewing PVC granulates 1232*b* of a third PVC material on the first reinforcing sheet 204 on the transporting device 2001 to provide the second sublayer 232*b* of the first layer 232 of PVC material;

strewing PVC granulates 1232*a* of a fourth PVC material on the strewn third PVC material 1232*b* on the transporting device 2001 to provide the first sublayer 232*a* of the first layer 232 of PVC material.

Once all these PVC granulates are strewn, a second transporting device 2002 sandwiches all the strewn granulates and reinforcing sheets between it and the first transporting device 2001.

From bottom and top, the sandwiched material is heated to melt the PVC granulates by a heating means 2003. The molten sandwiched material is compressed by a set of rollers 2004, which may be a so-called S-curve pressing device, or a steel belt press 2005 or as shown in FIG. 10, by both a set of rollers and a steel belt press. The compressed sandwiched material is cooled by a cooling device 2006.

By means of a heating device 205 the upper surface of the PVC intermediate is heated, as well as the lower side of the sheet vinyl 100. By thermal lamination in laminator 300 the sheet vinyl and the PVC intermediate are combined, and the combination is embossed by embossing roll 350 to provide the floor covering 900.

It is to be understood that although preferred embodiments and/or materials have been discussed for providing embodiments according to the present invention, various modifications or changes may be made without departing from the scope and spirit of this invention.

The invention claimed is:

1. A method for manufacturing floor covering elements, said floor covering elements having a rectangular circumference with two pairs of mutually opposing sides, the method comprising:

providing a floor covering at least by extruding a first layer of a PVC intermediate having a density of 1.7 kg/dm$^3$ or above, calibrating said first layer in thickness by means of a calibration device, subsequently laminating thereto at least a decorative layer and a wear layer contacting said decorative layer and subsequently embossing said wear layer, wherein said first layer comprises a first extruded PVC material, wherein said first extruded PVC material comprises polyvinylchloride or a copolymer of vinylchloride and vinyl acetate, has a Fikentscher K value in the range of 50 to 67, is free from plasticizers or comprises less than 6 phr of plasticizers and comprises at least 30 wt % of fillers;

dividing the floor covering in at least two floor covering elements;

providing said two floor covering elements, at least at a first pair of said two pairs of two mutually opposing sides with coupling means allowing said two floor covering elements to be coupled to each other while locking the sides in a vertical direction perpendicular to the plane of the floor covering elements, where at least one of said sides is provided with a tongue, the opposite side being provided with a groove fit for receiving said tongue.

2. The method of claim 1, wherein said fillers are selected from the group consisting of calcium carbonate, talc and microspheres.

3. The method of claim 2, wherein said first layer further comprises lubricants and thermal stabilizers.

4. The method of claim 1, wherein said calibration device comprise at least a set of calibration rollers.

5. The method of claim 1, wherein said embossing is by means of an embossing roller.

6. The method of claim 1, wherein said providing a floor covering further comprises extruding at least a second layer of said PVC intermediate.

7. The method of claim 6, wherein said second layer is comprised of said first extruded PVC material.

8. The method of claim 6, wherein said PVC intermediate further comprises a reinforcing sheet, said reinforcing sheet being a fibrous material.

9. The method of claim 8, wherein said first layer and said second layer are extruded at opposite sides of said reinforcing sheet.

10. The method of claim 6, wherein said first layer and said second layer are extruded by means of separate extruders.

11. The method of claim 1, wherein said first layer is non-foamed or foamed with a density reduction of less than 10% compared to the density of an equal volume of PVC which is free from hollow spaces.

12. The method of claim 1, wherein said first layer is mechanically or chemically foamed.

13. A method for manufacturing floor covering elements, said floor covering elements having a rectangular circumference with two pairs of mutually opposing sides, the method comprising:

providing a floor covering at least by extruding a first layer of a PVC intermediate having a density of 1.7 kg/dm$^3$ or above, calibrating said first layer in thickness by means of a calibration device, subsequently laminating thereto at least a decorative layer and a wear layer contacting said decorative layer and subsequently embossing said wear layer by means of an embossing roller, wherein said first layer comprises a first extruded PVC material, wherein said first extruded PVC material comprises polyvinylchloride or a copolymer of vinylchloride and vinyl acetate, has a Fikentscher K value in the range of 50 to 67, is free from plasticizers or comprises less than 6 phr of plasticizers and comprises at least 30 wt % of fillers, wherein said fillers are selected from the group consisting of calcium carbonate, talc and microspheres, wherein said first layer is non-foamed or foamed with a density reduction of less than 10% compared to the density of an equal volume of PVC which is free from hollow spaces;

dividing the floor covering in at least two floor covering elements;

providing said two floor covering elements, at least at a first pair of said two pairs of two mutually opposing sides with coupling means allowing said two floor covering elements to be coupled to each other while locking the sides in a vertical direction perpendicular to the plane of the floor covering elements, where at least one of said sides is provided with a tongue, the opposite side being provided with a groove fit for receiving said tongue.

14. The method of claim 13, wherein said first layer further comprises lubricants and thermal stabilizers.

15. The method of claim 13, wherein said calibration device comprise at least a set of calibration rollers.

16. The method of claim 13, wherein said providing a floor covering further comprises extruding at least a second layer of said PVC intermediate, wherein said first layer and said second layer are extruded by means of separate extruders.

17. The method of claim 16, wherein said second layer is comprised of said first extruded PVC material.

18. The method of claim 16, wherein said second layer is non-foamed or foamed with a density reduction of less than 10% compared to the density of an equal volume of PVC which is free from hollow spaces.

19. The method of claim 16, wherein said PVC intermediate further comprises a reinforcing sheet, said reinforcing sheet being a fibrous material, wherein said first layer and said second layer are extruded at opposite sides of said reinforcing sheet.

* * * * *